United States Patent [19]

Vasile

[11] Patent Number: 4,700,489
[45] Date of Patent: Oct. 20, 1987

[54] SQUARE LEVEL MEASURING TOOL

[76] Inventor: Anthony J. Vasile, 101 Sea Island La., Boca Raton, Fla. 33445

[21] Appl. No.: 902,648

[22] Filed: Sep. 2, 1986

[51] Int. Cl.[4] .......................... B43L 7/00; G01B 3/10
[52] U.S. Cl. .................................. 33/342; 33/138; 33/451; 33/480
[58] Field of Search ................ 33/138, 332, 334, 342, 33/451, 480, DIG. 1

[56] References Cited

U.S. PATENT DOCUMENTS

| 501,774 | 7/1893 | Dunnington | 33/480 |
|---|---|---|---|
| 530,111 | 12/1894 | Krebs | 33/480 |
| 652,814 | 7/1900 | Setzer | 33/342 |
| 825,217 | 7/1906 | Hull et al. | 33/342 |
| 1,324,411 | 12/1919 | Rosenholm | 33/342 |
| 1,663,821 | 3/1928 | Tuomi | 33/332 |
| 3,335,498 | 8/1967 | Barbee | 33/342 |
| 3,364,581 | 1/1968 | Andrews | 33/451 |
| 3,443,316 | 5/1969 | Edgell | 33/138 |
| 3,568,322 | 3/1971 | Showers | 33/332 |
| 3,838,520 | 10/1974 | Quenot | 33/138 |

FOREIGN PATENT DOCUMENTS 478074  10/1951  Canada ................ 33/480

Primary Examiner—Richard R. Stearns

[57] ABSTRACT

A Square-Level-Measuring Tool provides a combination of several tools including a tape measure, levels, stud locator and marker, packaged into a single unit. This new tool is light weight, convenient to carry, easy to use and saves time.

9 Claims, 2 Drawing Figures

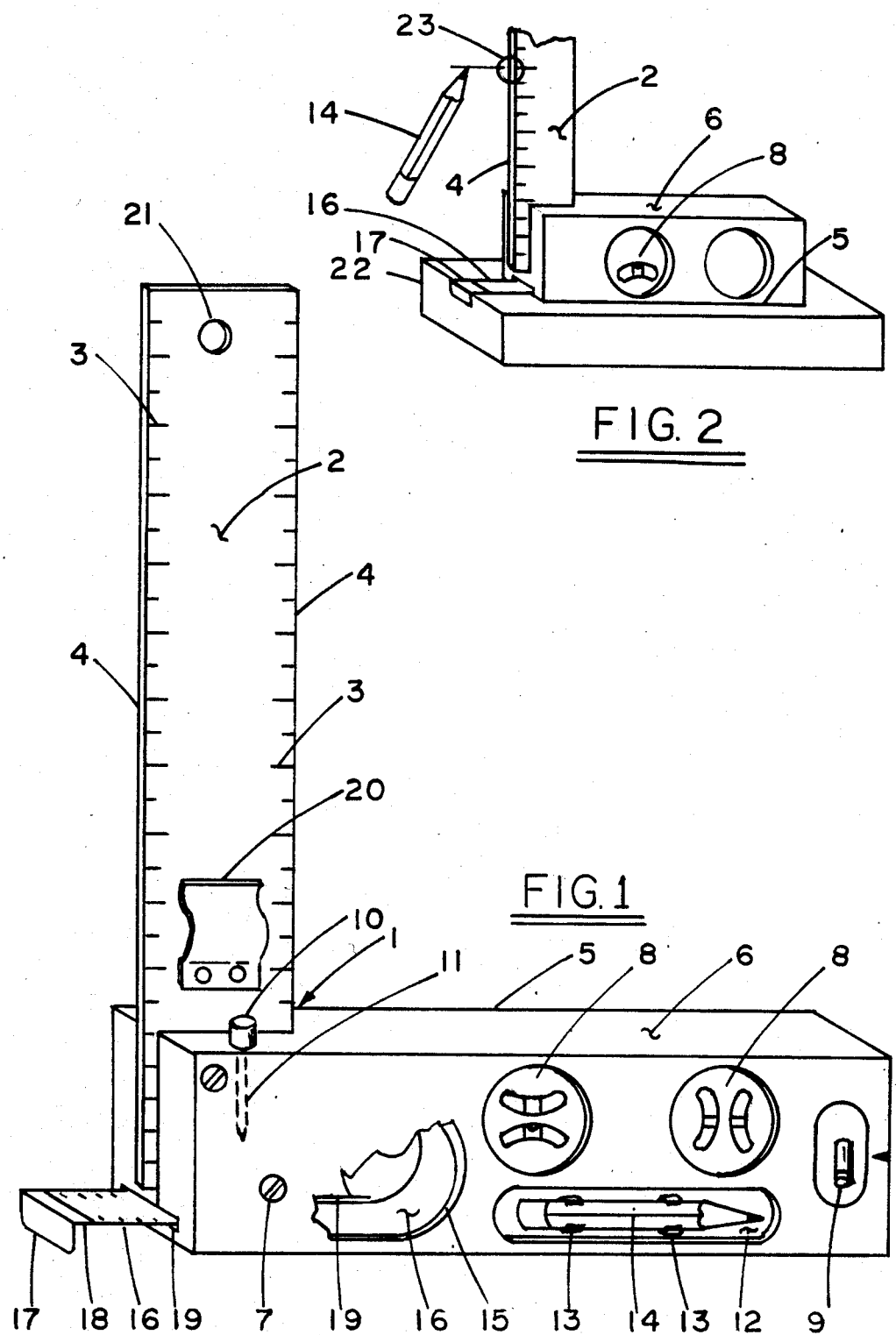

SQUARE LEVEL MEASURING TOOL

BACKGROUND OF THE INVENTION

1. Field of the Invention

This invention relates to the field of hand tools and it is designed to create means to combine several commonly used hand tools into one unit.

2. Description of Prior Art

In the past, efforts were made to simplify or combine tools, but unfortunately, in most cases, these efforts resulted in partial success only. This revolutionary new invention contains a carefully chosen and well-coordinated group of tools to gain better utility.

SUMMARY OF THE INVENTION

The inventive tool in one embodiment resembles a carpenter's square where the longer straight edge of the square is marked on both surfaces with inches or metric measuring units and fractions thereof. The shorter edge is affixed in right angles to the longer edge and it contains builtin levels, recoil-type tape measure, an attachment clip, marking devices, and a stud finder.

BRIEF DESCRIPTION OF THE DRAWINGS

Various other objects, advantages, and features of the invention will become apparent to those skilled in the art. The following discussion taken in conjunction with subsequent drawings shows:

FIG. 1 as a view of one embodiment of the present invention showing partial cross-sectional view of the recoiled measuring tape.

FIG. 2 shows a typical application of the inventive tool.

DESCRIPTION OF THE PREFERRED EMBODIMENT

FIG. 1 shows one of the preferred embodiments of the Square-Level-Measuring tool, depicting the entire device and a partial cutaway of certain hidden areas. The main body of the tool is a square 1 composed by the vertical scale 2 made of metals or hard nonmetals. Both edges of the scale 2 is engraved with inch or metric graduations 3 showing full units and fractions thereof. The edges 4 are straight and parallel to each other. The horizontal stock 5 is made of hard wood, plastics or of light metals such as aluminum alloys and it is rigidly attached to the vertical scale 2 by fasteners 7. The horizontal stock 5 has straight and parallel longitudinal edges 6. The edges 4 of the vertical scale 2 and the longitudinal edges 6 of the horizontal stock 5 are oriented in right angles to each other. There are two pairs of bubble levels 8 affixed and rigidly attached to the inside of the horizontal stock 5 and are oriented in right angles respectively to each other, making possible to establish true horizontal or vertical directions using either edge of the square 1. Recessed and aligned with the centerline of the horizontal stock 5, a stud finder 9 is secured in place to locate hidden nails. A hard steel pointed marker scriber 10 is pushed into a mating hole 11. In a recessed portion 12, of the horizontal stock 5, spring clips 13 are holding a marking device 14, a pen or pencil in place. An oval or circular shaped internal cavity 15 is provided within the horizontal stock 5 to store a flexible recoil-type measuring tape 16, having a metal catch 17, affixed to its end 18. The measuring tape 16 passes through a channel 19. When the measuring tape 16 is fully retracted and the catch 17 is out of the way, it will not inhibit the use of the square 1 to check right angles with. An attachment clip 20 and circular bore 21 are provided to make it easy to carry and to store the inventive tool.

FIG. 2 will explain a typical practical use of the inventive tool. The horizontal stock 5 is resting on the substrate 22 where the bubble level 8 indicates that the substrate 22 is level. The catch 17 hooked to the edge of the substrate 22 and the tape 16 indicates the distance between said edge of the substrate 22 and the edge 4 of the vertical scale 2. A point 23 may be established at a desired elevation along the edge 4 of the vertical scale 2 and defined by the marking device 14 as shown.

While the invention has been described, disclosed, illustrated and shown in certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

What is claimed is:

1. Square-level-measuring tool comprising
   square assembly composed by graduated scale means rigidly attached to a straight stock means by fasteners;
   a set of bubble levels and stud finder means affixed within said straight stock means;
   scriber means received in a hollow bore within said straight stock means;
   marking device means held by spring clip means within said straight stock means;
   recoil-type measuring tape means having a metal catch affixed to its end mounted within and extending from said straight stock means;
   attachment clip means affixed to said scale means and a hollow bore through said scale means.

2. The apparatus of claim 1, wherein said scale means having straight and parallel edges and marked with measuring units along said edges.

3. The apparatus of claim 2, wherein said straight stock means having straight flat and parallel edges and where the long edges are oriented at right angles to the edges of said scale means.

4. The apparatus in claim 1, wherein said set of bubble levels being received and affixed within bored holes provided in said straight stock means, and one of said bubble levels being oriented to be centered when said straight stock means is held level, and the other bubble level being centered when said straight stock means is oriented vertically.

5. The apparatus of claim 1, wherein said stud finder means is inserted into one end of said straight stock means.

6. The apparatus of claim 1, wherein a hard-pointed scriber means is slidingly received by a mating hole formed in said straight stock means.

7. The apparatus in claim 1, wherein said recoil-type measuring tape means being slidingly received by hollow bore and channel means within said straight stock means, thus allowing manual extension and retraction of said measuring tape means.

8. The apparatus of claim 1, wherein said marking device means is held by mating spring clip means within a recessed portion of said straight stock means.

9. The apparatus of claim 1, wherein said attachment clip means affixed to said scale means being provided to safely carry said square assembly, and said hollow bore through said scale means being to secure said square assembly in storage by hanging.

* * * * *